(12) United States Patent
Ren et al.

(10) Patent No.: US 11,451,336 B2
(45) Date of Patent: Sep. 20, 2022

(54) REPETITION TRANSMISSION METHOD AND APPARATUS, NETWORK DEVICE, AND COMPUTER READABLE STORAGE MEDIUM

(71) Applicant: ZTE CORPORATION, Guangdong (CN)

(72) Inventors: Min Ren, Shenzhen (CN); Peng Hao, Shenzhen (CN); Shuqiang Xia, Shenzhen (CN); Jing Shi, Shenzhen (CN); Xianghui Han, Shenzhen (CN); Chunli Liang, Shenzhen (CN); Wei Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/114,734

(22) Filed: Dec. 8, 2020

(65) Prior Publication Data

US 2021/0091890 A1     Mar. 25, 2021

Related U.S. Application Data

(63) Continuation of application No. PCT/CN2019/100179, filed on Aug. 12, 2019.

(30) Foreign Application Priority Data

Aug. 10, 2018   (CN) .......................... 201810910225.9

(51) Int. Cl.
*H04L 1/08*         (2006.01)
*H04W 72/04*     (2009.01)
*H04W 84/04*     (2009.01)

(52) U.S. Cl.
CPC ............. *H04L 1/08* (2013.01); *H04W 72/042* (2013.01); *H04W 72/0446* (2013.01); *H04W 84/042* (2013.01)

(58) Field of Classification Search
CPC ....... H04L 1/08; H04L 1/0009; H04L 5/0094; H04L 1/0003; H04L 1/1819; H04L 1/189;
(Continued)

(56) References Cited

U.S. PATENT DOCUMENTS 8,699,411 B1    4/2014  Gossett et al.
2004/0248582 A1  12/2004  Belaiche et al.
(Continued)

FOREIGN PATENT DOCUMENTS

CN           106936540 A      7/2017
WO     WO-2012/022198 A1    2/2012
(Continued)

OTHER PUBLICATIONS

CMCC: "Discussion on PUSCH repetition for grant-free transmission" 3GPP TSG RAN WG1 Meeting #92bis; R1-1804103; Apr. 20, 2018; Sanya, China (3 pages).
(Continued)

*Primary Examiner* — Kabir A Timory
(74) *Attorney, Agent, or Firm* — Foley & Lardner LLP

(57) ABSTRACT

Provided are a repeated transmission method and apparatus, a network device, and a storage medium. The method includes: determining a plurality of transmission occasions (TOs) for uplink data to be repeatedly transmitted; and in condition that at least one TO, among the plurality of TOs for the uplink data to be repeatedly transmitted, does not conflict with a transmission direction of a slot configuration, repeatedly transmitting the uplink data on the at least one TO.

20 Claims, 6 Drawing Sheets

(58) Field of Classification Search
CPC .. H04L 5/0053; H04L 1/0013; H04W 72/042; H04W 72/0446; H04W 84/042; H04W 72/121
See application file for complete search history.

(56) References Cited

U.S. PATENT DOCUMENTS

2013/0329667 A1    12/2013    Wengerter et al.
2020/0351048 A1*   11/2020    Jo ................... H04W 72/042

FOREIGN PATENT DOCUMENTS

| WO | WO-2018/004246 | | 1/2018 |
| WO | WO-2019/144860 | A1 | 8/2019 |
| WO | WO-2019/165448 | A1 | 8/2019 |

OTHER PUBLICATIONS

Etri: "Potential enhancements to PUSCH" 3GPP TSG RAN WG1 #96; R1-1902443; Mar. 1, 2019; Athens, Greece (8 pages).
Extended European Search Report for EP Appl. No. 19847359.7, dated Jul. 1, 2021 (13 pages).
Zte: "Enhancement for UL grant-free transmissions" 3GPP TSG RAN WG1 Meeting #94bis; R1-1810347; Oct. 12, 2018; Chengdu, China (6 pages).
International Search Report and Written Opinion for PCT Appl. No. PCT/CN2019/100179 dated Sep. 26, 2019 (with English translation, 8 pages).
Zte et al.: "Remaining Issues for UL Data Transmission Procedure" 3GPP TSG RAN WGJ Meeting #92bis R1-1803797, Apr. 20, 2018 (Apr. 20, 2018), Sanya, China (8 pages).
First JP Office Action on JP 2021-500400 dated Mar. 31, 2022 (9 pages, including English translation).
Intel Corporation, "UCI multiplexing onto PUSCH", 3GPP TSG-RAN WG1 Meeting #90 R1-1712584, [online], Aug. 12, 2017, pp. 1-4, [retrieved on Mar. 28, 2022].
Vivo, "Support of long-PUCCH over multiple slots", 3GPP TSG-RAN WG1 Meeting #91 R1-1719790, [online], Nov. 18, 2017, pp. 1-4, [retrieved on Mar. 28, 2022].
WILUS Inc., "Remaining issues on long PUCCH over multiple slots", 3GPP TSG-RAN WG1 Meeting #93 R1-1807234, [online], May 12, 2018, pp. 1-4, [retrieved on Mar. 28, 2022].
Search Report and Written Opinion on SG 11202100229Q, dated Jul. 1, 2022 (11 pages).
WILUS Inc., "Remaining issues on long PUCCH over multiple slots", 3GPP TSG RAN WG1 Meeting #92bis; R1-1805242, Sanya, China; Apr. 20, 2018 (3 pages).

* cited by examiner

REPETITION TRANSMISSION METHOD AND APPARATUS, NETWORK DEVICE, AND COMPUTER READABLE STORAGE MEDIUM

CROSS-REFERENCE TO RELATED APPLICATIONS

This application claims the benefit of priority under 35 U.S.C. § 120 as a continuation of PCT Patent Application No. PCT/CN2019/100179, filed on Aug. 12, 2019, which claims priority to Chinese Patent Application No. 201810910225.9, filed on Aug. 10, 2018, the disclosure of each of which is incorporated herein by reference in its entirety.

TECHNICAL FIELD

The present disclosure relates to, but is not limited to, the field of network communications and, in particular, relates to, but is not limited to, a repeated transmission method and apparatus, a network device, and a computer readable storage medium.

BACKGROUND

Standard formulation in a first phase of the 5th Generation mobile communication technology (5G) has been completed. From the perspective of standard formulation and technical development trends, a 5G system is dedicated to research on a higher rate (e.g. Gbps), massive links (e.g. 1 M/km$^2$), ultra-low latency (e.g. 1 ms), higher reliability, energy efficiency improvement by a factor of 100, and other technical indicators to support new demand changes. In the first phase of 5G, slot-based aggregation according to dynamic scheduling and grant-free slot-based repetitions are introduced to ensure coverage, which means that a terminal repeatedly sends a transport block (TB) by use of a plurality of slots, and the TB is allocated with same time domain resources on each slot. The number of slots that can be aggregated or repeated is 1/2/4/8. In a second phase of 5G, to support a feature of ultra-reliable low-latency transmissions and transmit ultra-reliable low-latency traffic in a short transmission time period, uplink aggregation transmissions according to dynamic scheduling and uplink grant-free repeated transmissions are enhanced, and mini-slot based aggregation or repetitions are introduced. That is, the terminal repeatedly sends the TB on a plurality of mini-slots consecutive in time domain in one slot, and each mini-slot has a same time domain duration.

Merely a solution for repeatedly sending uplink data on corresponding time domain symbols in different slots has been formulated. A solution for repeatedly sending the uplink data in a single slot has greater limitations. When a transmission occasion conflicts with a transmission direction of a slot configuration, the entire uplink data repeatedly transmitted will be discarded, which greatly wastes network resources.

SUMMARY

Embodiments of the present disclosure provide a repeated transmission method and apparatus, a network device, and a computer readable storage medium, which mainly solve the problem in the related art of an IAB access in IAB architecture.

The embodiments of the present disclosure provide a repeated transmission method. The method includes steps described below.

A plurality of transmission occasions (TOs) for uplink data to be repeatedly transmitted is determined.

When at least one TO, among the plurality of TOs for the uplink data to be repeatedly transmitted, does not conflict with a transmission direction of a slot configuration, the uplink data is repeatedly transmitted on the TO.

The embodiments of the present disclosure further provide a repeated transmission method. The method includes steps described below.

It is determined whether a type of a repeated transmission of uplink data is a first transmission type or a second transmission type. The first transmission type is repeatly transmitted uplink data according to a plurality of slots, and the second transmission type is repeatly transmitted uplink data according to a plurality of mini-slots in one slot.

The uplink data is repeatedly transmitted according to the determined type of the repeated transmission of the uplink data.

The embodiments of the present disclosure further provide a repeated transmission method. The method includes steps described below.

A plurality of TOs for uplink data to be repeatedly transmitted is determined.

When at least one TO, among the plurality of TOs for the uplink data to be repeatedly transmitted, does not conflict with a transmission direction of slot configuration, repeatedly transmitted uplink data is received on the TO.

The embodiments of the present disclosure further provide a repeated transmission apparatus. The apparatus includes a first transmission determining module and a first transmission module. The first transmission determining module is configured to determine a plurality of TOs for uplink data to be repeatedly transmitted.

The first transmission module is configured to: when at least one TO, among the plurality of TOs for the uplink data to be repeatedly transmitted, does not conflict with a transmission direction of slot configuration, repeatedly transmit the uplink data on the TO.

The embodiments of the present disclosure further provide a repeated transmission apparatus. The apparatus includes a second transmission determining module and a transmission receiving module.

The second transmission determining module is configured to determine a plurality of TOs for uplink data to be repeatedly transmitted.

The transmission receiving module is configured to: when at least one TO, among the plurality of TOs for the uplink data to be repeatedly transmitted, does not conflict with a transmission direction of slot configuration, receive repeatedly transmitted uplink data on the TO.

The embodiments of the present disclosure further provide a repeated transmission apparatus. The apparatus includes a type determining module and a second transmission module.

The type determining module is configured to determine whether a type of a repeated transmission of uplink data is a first transmission type or a second transmission type. The first transmission type is repeatly transmitted uplink data according to a plurality of slots, and the second transmission type is repeatly transmitted uplink data according to a plurality of mini-slots in one slot.

The second transmission module is configured to repeatedly transmit the uplink data according to the determined type of the repeated transmission of the uplink data.

The embodiments of the present disclosure further provide a network device. The network device includes a processor, a memory and a communication bus.

The communication bus is configured to implement connection and communication between the processor and the memory.

The processor is configured to execute one or more computer programs stored in the memory to implement the preceding method.

The embodiments of the present disclosure further provide a computer readable storage medium, storing one or more programs executable by one or more processors to implement the preceding method.

DETAILED DESCRIPTION

Embodiments of the present disclosure are optionally described below in detail in conjunction with the drawings and specific implementations. The embodiments described herein are intended to explain the present disclosure and not to limit the present disclosure.

Regardless of mini-slot based aggregation based on dynamic scheduling or grant-free mini-slot based repetitions, when a transmission occasion collides with a transmission direction of slot configuration, whether the transmission occasion is omitted, and how to determine resource configuration of repeated transmission occasions are to be considered. Moreover, due to the collision with a transmission direction of slot configuration, a base station may delay configuring a plurality of transmission occasions which are even configured on different slots. As listed above, a 5G system supports traffic with a strict latency requirement. How to ensure that a terminal completes a plurality of repeated uplink data within certain latency is also a problem to be considered. In addition, it is worth mentioning that in a plurality of embodiments of the present disclosure, the collision of the transmission occasion with the transmission direction of the slot configuration may also be referred to as a conflict of the transmission occasion with the transmission direction of the slot configuration. The uplink data may specifically include a TB, a physical uplink shared channel (PUSCH), and data sent from the terminal to the base station, etc. which may all be regarded as the uplink data in the plurality of embodiments of the present disclosure.

First Embodiment

Figure 1:
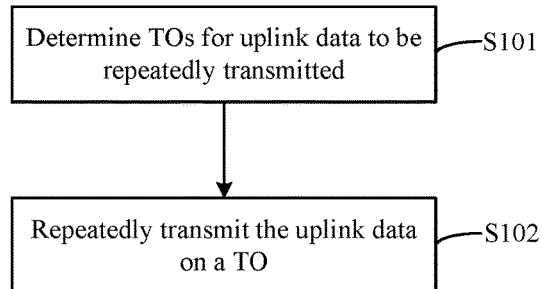
FIG. 1 is a flowchart of a repeated sending method according to a first embodiment of the present disclosure.

This embodiment provides a repeated transmission method. Referring to FIG. 1, the repeated transmission method includes S101 and S102.

In S101, a plurality of transmission occasions (TOs) for uplink data to be repeatedly transmitted is determined.

In S102, when at least one TO, among the plurality of TOs for the uplink data to be repeatedly transmitted, does not conflict with a transmission direction of slot configuration, the uplink data is repeatedly transmitted on the TO.

In some embodiments, the step in which the uplink data is repeatedly transmitted on the TO may include a step described below.

The uplink data to be repeatedly transmitted is transmitted from an earliest TO in the time domain that does not conflict with the transmission direction of slot configuration. The slot configuration may include an uplink symbol U, a downlink symbol D, and a flexibly configured symbol F. For the uplink data to be repeatedly transmitted in the embodiments of the present disclosure, a transmission direction matched with the uplink data is U, that is, when the transmission direction of the slot configuration is U, the transmission occasion (TO) of the uplink data does not conflict with the transmission direction of the slot configuration; if the transmission direction of the slot configuration is D, the TO certainly conflicts with it; and if the transmission direction of the slot configuration is F, the conflict or not is determined according to a current transmission situation.

In some embodiments, the step in which the uplink data to be repeatedly transmitted is transmitted from the earliest TO in the time domain that does not conflict with the transmission direction of slot configuration may include a step described below.

Among the uplink data to be repeatedly transmitted, uplink data with a redundancy version (RV) index of 0 is repeatedly transmitted from the earliest TO in the time domain. Generally, an RV index corresponding to an earliest TO which may transmit uplink data is 0, which follows an agreement between a base station and a terminal, and complies with a rule thereof. When the same piece of uplink data to be repeatedly transmitted includes two or more pieces of uplink data with an RV index of 0, a first RV index of 0 or any RV index of 0 may be taken as reference.

Alternatively, among the uplink data to be repeatedly transmitted, uplink data corresponding to the earliest TO in the time domain is repeatedly transmitted from the earliest TO in the time domain. Except for the reference to RV=0, the uplink data corresponding to the earliest TO in the time domain which does not conflict may start to be transmitted from the earliest TO in the time domain. In this case, an RV index of the uplink data starting to be transmitted may not be 0.

In some embodiments, the earliest TO in the time domain that does not conflict with the transmission direction of slot configuration includes following TOs:

among the plurality of TOs, an earliest TO in the time domain in which none of time domain symbols conflicts with the transmission direction of the slot configuration; this means that for the earliest TO in the time domain, none of the time domain symbols in the TO conflicts with the transmission direction of slot configuration; if the TO includes two time domain symbols, neither of the two time domain symbols conflicts with the transmission direction of slot configuration, for example, the corresponding transmission direction of slot configuration is UU or FU;

or among the plurality of TOs, an earliest TO in the time domain in which at least one time domain symbol does not conflict with the transmission direction of slot configuration. In this case, the earliest TO in the time domain means that as long as one of time domain symbols in the TO does not conflict, the TO may be considered as the earliest TO in the time domain which does not conflict.

In some embodiments, the slot configuration may be obtained in at least one of manners below.

A slot configuration is indicated by downlink control information (DCI).

A slot configuration is indicated by radio resource control (RRC).

In some embodiments, the step in which the uplink data is repeatedly transmitted on the TO may include that when at least one time domain symbol in the TO does not conflict with the transmission direction of slot configuration, rate matching is performed on a non-conflicting time domain symbol in the TO. Since at least one time domain symbol in the TO does not conflict with the transmission direction of slot configuration and the other symbols may conflict, to ensure a normal transmission of the uplink data, the rate matching is performed on the non-conflicting time domain symbol in the TO.

In some embodiments, the step in which the rate matching is performed on the non-conflicting time domain symbol in the TO may include a step described below.

A modulation order in a modulation and coding scheme (MCS) parameter configured via the RRC is maintained unchanged, a new code rate is calculated according to remaining available resources in the TO, and the rate matching is performed according to the new code rate.

Alternatively, a new modulation order and a code rate are calculated for an uplink transmission, information about the calculated modulation order is reported to the base station, and the code rate is calculated according to the modulation order and the remaining available resources in the TO.

Alternatively, a new modulation order is calculated according to available resources, and the uplink data is directly sent according to a code rate and the new modulation order.

In some embodiments, the step in which the uplink data is repeatedly transmitted on the TO may further include a step described below.

The DCI is detected to indicate a usage situation of the TO. The DCI is a newly added detection means for a repeated transmission of the uplink data on a base station side, and the terminal may determine a usage situation of a current TO by detecting the DCI. In some embodiment, the step in which the DCI is detected to indicate the usage situation of the TO includes steps described below.

The DCI is detected to acquire a relevant parameter configured for an uplink grant-free transmission.

A transmission parameter of an indicated TO is adjusted, and the uplink data is repeatedly transmitted according to an adjusted TO.

In some embodiments, the relevant parameter configured for the uplink grant-free transmission may include at least one of: a time domain resource, a frequency domain resource, a number K of repeated transmissions configured via the RRC, a TO index, an MCS, or a time when a reconfigured parameter takes effect or a number of times that the reconfigured parameter takes effect.

In some embodiments, the step in which the uplink data is repeatedly transmitted on the TO may further include: not counting a TO in which a time domain symbol conflicts with the transmission direction of slot configuration into a number of repeated transmissions of the uplink data, and continuing the repeated transmissions of the uplink data on a TO configured later. This means that the uplink data is not transmitted on a conflicting TO, and a non-conflicting TO is directly configured on later time domain symbols for a transmission.

In some embodiments, the step in which the uplink data is repeatedly transmitted on the TO further includes: repeatedly transmitting uplink data corresponding to the TO in which the time domain symbol conflicts with the transmission direction of the slot configuration is postponed to the preconfigured redundant TO. This means that when the base station configures TOs for the terminal, a number of repetitions required by the terminal is directly added by a certain redundant configuration amount, to flexibly adjust a repeated transmission of an uplink signal. For example, when the number of repeated transmissions required by the terminal is 4, the number of TOs configured by the base station for the terminal may be 5, so that when one of the first four TOs conflicts, the redundant TO may make up 4 available TOs to repeatedly send the uplink data.

In some embodiments, the step in which the uplink data is repeatedly transmitted on the TO further includes: repeatedly transmitting the uplink data on a preconfigured TO which does not conflict with the transmission direction of the slot configuration. This means that the TOs are directly configured in a pre-configuration manner, time domain symbols which will conflict with the transmission direction of the slot configuration are skipped, and the TOs are directly configured on non-conflicting time domain symbols.

In some embodiments, further included is acquiring a time window, and determining a situation of sending the uplink data on a delayed TO through the time window. The time window is set to ensure latency. Among 5G traffic, ultra-reliable low-latency communication (URLLC) has a high latency requirement. If uplink data corresponding to the conflicting TOs is all delayed, a latency requirement may not be satisfied, resulting in problems of URLLC traffic. Therefore, the time window is set to monitor whether the number of repeated transmissions of the uplink data exceeds an expectation.

In some embodiments, a sum of the time window and processing time of the terminal and the base station is less than or equal to a first preset threshold. The first preset threshold varies according to latency requirements of different traffic. For example, for the URLLC traffic, a size of the first preset threshold may be 1 ms. Of course, this embodiment merely provides a possible example of the first preset threshold. Those skilled in the art should understand that the first preset threshold may be a reasonable duration for a corresponding traffic type and is not limited in this embodiment.

In some embodiments, the step of determining the situation of sending the uplink data on the delayed TO through the time window includes a step described below.

Among the uplink data to be repeatedly transmitted, a duration from a first transmission to the delayed TO is compared with the time window, and when the duration is less than or equal to the time window, the uplink data may be sent on the delayed TO.

Alternatively, among the uplink data to be repeatedly transmitted, a duration from when a last symbol of a control resource set CORESET where the DCI is located is detected to the delayed TO is compared with the time window, and when the duration is less than or equal to the time window, the uplink data may be sent on the delayed TO.

In some embodiments, the step in which the uplink data is repeatedly transmitted on the TO may further include a step described below.

An actual number of repetitions of the uplink data is determined according to an indication from the base station. In this case, the indication from the base station is directly received to determine the number of repeated transmissions. For example, the base station determines the number of repeated transmissions to be 2 according to the latency of the uplink data, and then a terminal side repeatedly transmits the uplink data twice on non-conflicting TOs. Even if the number is set to 4, two repeated transmissions indicated by the base station are still performed. In some embodiments, the step in which the actual number of repetitions of the uplink data is determined according to the indication from the base station may include a step described below.

It is determined whether the uplink data is capable of being sent on each TO according to a target value of latency, and the actual number of repetitions is determined.

In some embodiments, the slot configuration includes a downlink symbol D, an uplink symbol U, and a flexibly configured symbol F; where when the transmission direction of the slot configuration indicates N consecutive F symbols, and a transmission direction of an adjacent symbol before the N consecutive F symbols is D, the uplink data is repeatedly transmitted from a time domain symbol corresponding to an M-th F symbol among the N consecutive F symbols, where M≤N, and the first (M−1) F symbols among the N consecutive F symbols serve as a guard period. Since downlink data is sent in D symbol, and according to different types of downlink data, a processing duration which the downlink data tends to occupy may include not only time domain symbols for the downlink data but also a certain period of time behind, F is not suitable for sending the uplink data. To ensure downlink data processing, the M-th F among the N consecutive F symbols may serve as the TO for transmitting the uplink data, and the first (M−1) F symbols may serve as the guard period for the downlink data.

In some embodiments, when a duration required for processing downlink data transmitted on time domain symbols corresponding to D symbols is greater than or equal to a second preset threshold, M<N. The downlink data is generally the DCI, a semi-statically configured physical downlink shared channel (PDSCH), or a physical downlink control channel (PDCCH), etc.

This embodiment provides a repeated transmission method. The plurality of transmission occasions (TOs) for the uplink data to be repeatedly transmitted is determined, and when at least one TO, among the plurality of TOs for the uplink data to be repeatedly transmitted, does not conflict with the transmission direction of the slot configuration, the uplink data is repeatedly transmitted on the TO, thereby implementing the repeated transmissions of the uplink data, preventing the uplink data to be repeatedly transmitted from being directly discarded in case of a conflict, saving network resources, and ensuring user experience.

Second Embodiment

Figure 2:
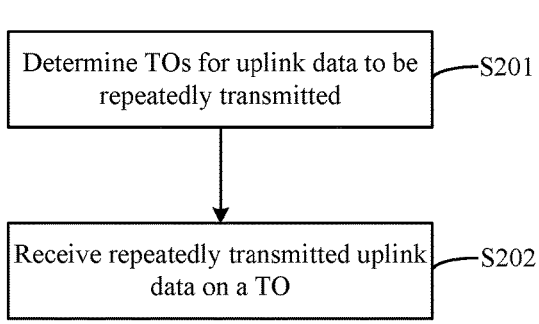
FIG. 2 is a flowchart of a repeated sending method according to a second embodiment of the present disclosure.

This embodiment provides a repeated transmission method. Referring to FIG. 2, the repeated transmission method includes S201 and S202.

In S201, a plurality of TOs for uplink data to be repeatedly transmitted is determined.

In S202, when at least one TO, among the plurality of TOs for the uplink data to be repeatedly transmitted, does not conflict with a transmission direction of a slot configuration, repeatedly transmitted uplink data is received through the TO.

In some embodiments, the step in which the repeatedly transmitted uplink data is received on the TO includes that when at least one time domain symbol in the TO conflicts with the transmission direction of the slot configuration, rate matching is performed on a non-conflicting time domain symbol in the TO.

In some embodiments, the step in which the rate matching is performed on the non-conflicting time domain symbol in the TO includes: maintaining a modulation order in an MCS parameter configured via RRC unchanged, calculating a new code rate according to remaining available resources in the TO, and performing the rate matching according to the new code rate.

In some embodiments, the step in which the repeatedly transmitted uplink data is received on the TO includes a step described below.

DCI is configured to indicate a usage situation of the TO to a terminal.

In some embodiment, the step in which the DCI is configured to indicate the usage situation of the TO includes a step described below.

A relevant parameter configured for an uplink grant-free transmission is reconfigured through the DCI.

In some embodiments, the step in which the repeatedly transmitted uplink data is received through the TO may include at least one of steps described below.

A TO in which a time domain symbol conflicts with the transmission direction of the slot configuration is not counted into a number of repeated transmissions of the uplink data, the TO is configured later, and the repeatedly transmitted uplink data is received on the TO configured later.

Uplink data corresponding to the TO in which the time domain symbol conflicts with the transmission direction of the slot configuration is received through a preconfigured redundant TO.

The repeatedly transmitted uplink data is received through a preconfigured TO which does not conflict with the transmission direction of the slot configuration.

In some embodiments, the step in which the repeatedly transmitted uplink data is received through the TO includes a step described below.

The terminal is notified of a actual number of repeated transmissions of the uplink data.

In some embodiments, the step in which the terminal is notified of the actual number of repeated transmissions of the uplink data include a step described below.

It is determined whether the uplink data is capable of being sent on each TO according to a target value of latency, and an actual number of repetitions is determined.

Third Embodiment

This embodiment provides a repeated transmission method. According to standards in a first phase of 5G, for a certain TB, a terminal can merely send the TB for the first time at a time domain position corresponding to RV=0. In the following examples, the number K of repetitions is 4.

Figure 3:
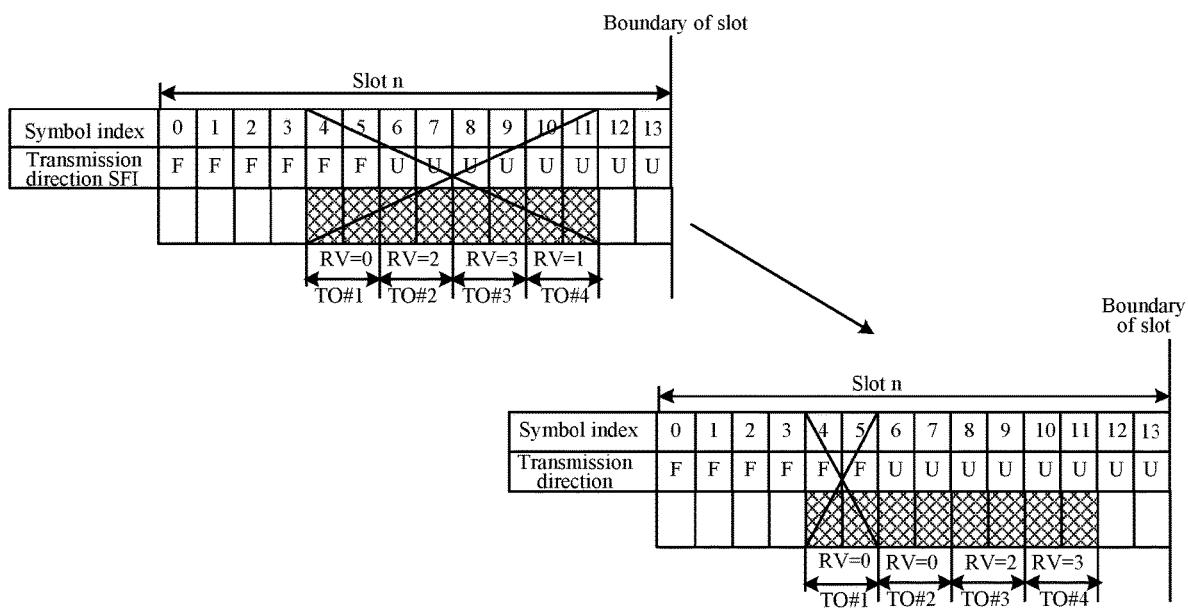
FIG. 3 is a schematic diagram illustrating an uplink data transmission according to an embodiment of the present disclosure.

An RV pattern is {0231}. As shown in FIG. 3, when TO #1 to TO #4 correspond to RV indexes of 0, 2, 3, 1, respectively, and time domain symbols where TO #1 is located collide with a dynamic slot format indicator (SFI), repeated transmissions need to be postponed to a TO that may transmit a PUSCH, and an RV index of 0 is also postponed to the TO. That is, the RV index of 0 on TO #1 is postponed to TO #2. Then the terminal performs a first transmission of the TB on TO #2.

Figure 4:
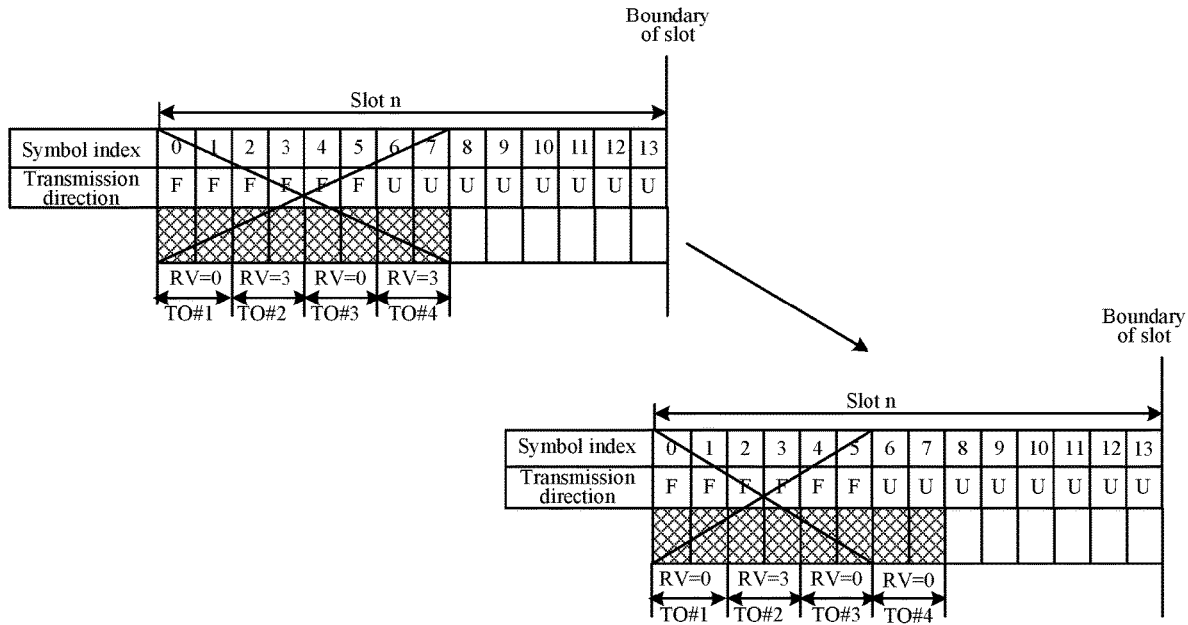
FIG. 4 is a schematic diagram illustrating an uplink data transmission according to an embodiment of the present disclosure.

The RV pattern is {0303}. As shown in FIG. 4, when TO #1 to TO #4 correspond to RV indexes of 0, 3, 0, 3, respectively, and all time domain symbols where TO #1 to TO #3 are located collide with the dynamic SFI, an RV index of 0 corresponding to TO #1 needs to be postponed to TO #4. Then the terminal performs the first transmission of the TB from RV=0 on TO #4.

Figure 5:
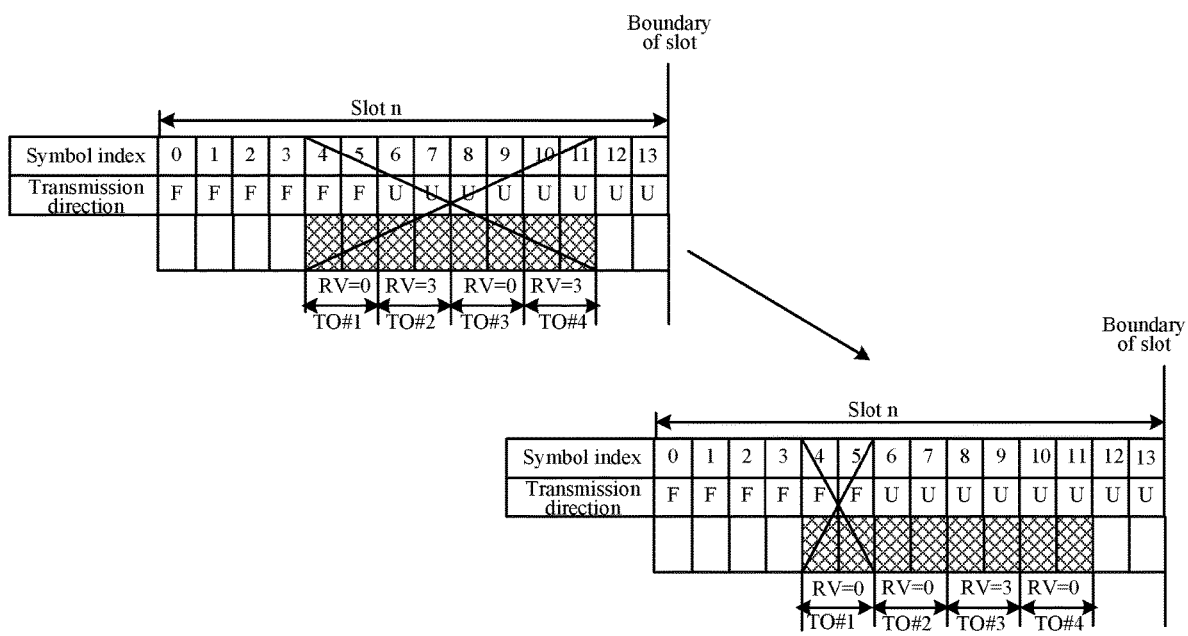
FIG. 5 is a schematic diagram illustrating an uplink data transmission according to an embodiment of the present disclosure.

The RV pattern is {0303}. As shown in FIG. 5, when TO #1 to TO #4 correspond to RV indexes of 0, 3, 0, 3, respectively, and time domain symbols where TO #1 is located collide with the dynamic SFI, the RV index of 0 corresponding to TO #1 needs to be postponed to TO #2. Then the terminal performs the first transmission of the TB from RV=0 on TO #2.

Fourth Embodiment

This embodiment provides a repeated transmission method. In a process of standard researches in a second phase of 5G, if a first phase is to be enhanced, a terminal is no longer limited to performing a first time of sending at a time domain position corresponding to RV=0 to ensure that the terminal can flexibly send a certain TB. In the following examples, the number K of repetitions is 4.

Figure 6:
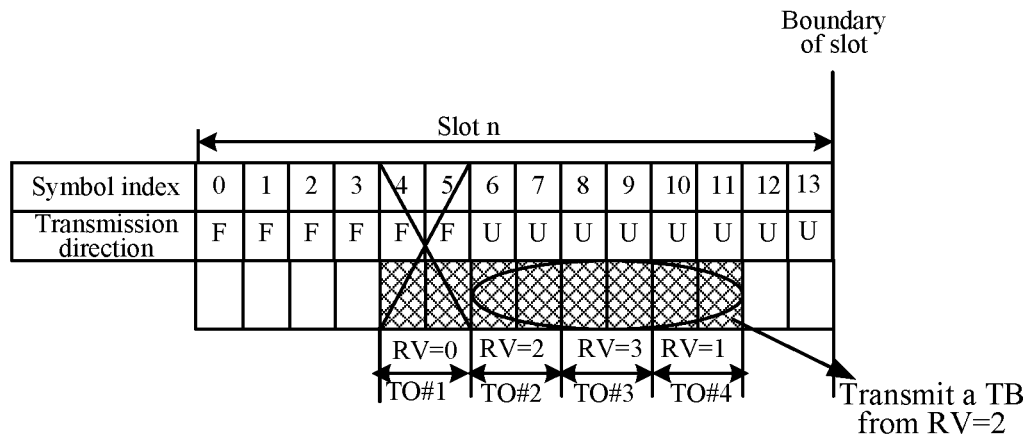
FIG. 6 is a schematic diagram illustrating an uplink data transmission according to an embodiment of the present disclosure.

An RV pattern is {0231}. As shown in FIG. 6, when TO #1 to TO #4 correspond to RV indexes of 0, 2, 3, 1, respectively, and time domain symbols where TO #1 is located collide with a dynamic SFI, the terminal may send the TB on a TO that may transmit a PUSCH. That is, the terminal performs a first transmission of the TB from RV index=2 on TO #2.

Figure 7:
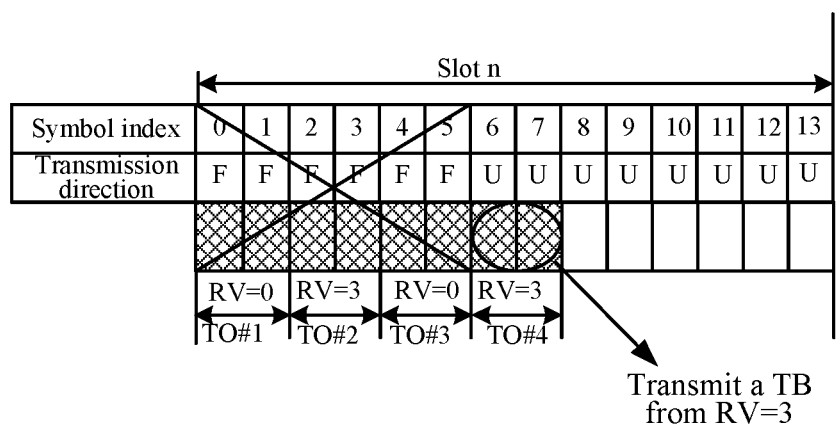
FIG. 7 is a schematic diagram illustrating an uplink data transmission according to an embodiment of the present disclosure.

The RV pattern is {0303}. As shown in FIG. 7, when TO #1 to TO #4 correspond to RV indexes of 0, 3, 0, 3, respectively, and all time domain symbols where TO #1 to TO #3 are located collide with the dynamic SFI, the terminal performs the first transmission of the TB from RV=3 on TO #4.

Figure 8:
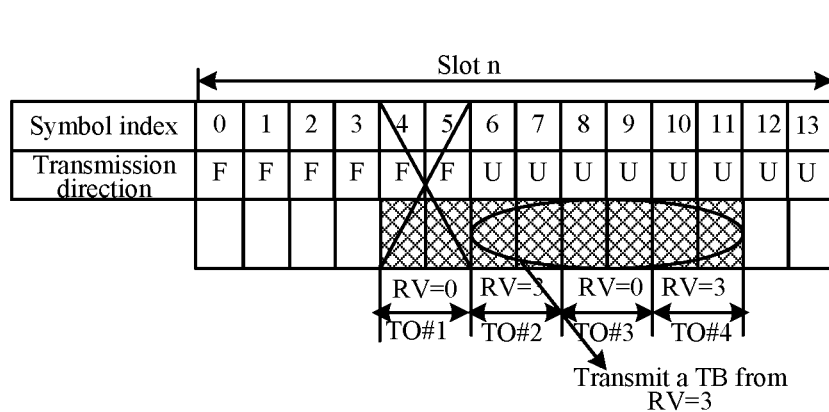
FIG. 8 is a schematic diagram illustrating an uplink data transmission according to an embodiment of the present disclosure.

The RV pattern is {0303}. As shown in FIG. 8, when TO #1 to TO #4 correspond to RV indexes of 0, 3, 0, 3, respectively, and time domain symbols where TO #1 is located collide with the dynamic SFI, the terminal performs the first transmission of the TB from RV=3 on TO #2.

Fifth Embodiment

This embodiment provides a repeated transmission method. A simple and effective method is that a gNB and a user equipment (UE) agree that if a certain repetition in a UL grant-free transmission conflicts with a dynamic SFI, rate matching is performed on a TO in the time domain where the repetition is located, and the rate matching is performed again according to available symbols on the TO for the repetition (the available symbols on the TO for the repetition are defined as symbols that do not conflict with a transmission direction in the dynamic SFI). Due to the lack of DCI signaling to indicate a corresponding parameter after the rate matching (such as a modulation order and a code rate), the gNB and the UE need to specify a criterion for performing the rate matching to avoid an inconsistent understanding between a base station side and a user side which causes a decoding error. The criterion for performing the rate matching between the gNB and the UE includes at least one of the following selection manners:

(1) The rate matching is performed on all of TOs for repeated transmissions in the uplink grant-free transmission that conflict with the dynamic SFI. A principle of the rate matching is to maintain a modulation order in an MCS parameter configured via RRC unchanged. Both a user and the base station calculate a new code rate according to remaining available resources in a certain repeated transmission that collides, and the user performs the rate matching according to the new code rate.

(2) The rate matching is performed on all of the TOs for repeated transmissions in the uplink grant-free transmission that conflict with the dynamic SFI. The principle of the rate matching is to allow the UE to change the modulation order and a code rate in the MCS parameter configured via the RRC. The UE performs an uplink transmission according to the calculated new modulation order and code rate, and the user reports information about the calculated modulation order to the base station. The base station calculates the code rate according to the modulation order reported by the UE and the remaining available resources in the TO for data demodulation.

The user may report the information about the modulation order in two manners below.

Manner one: a PUCCH is used. When configuring grant-free PUSCH resources through the RRC or DCI, the base station also configures PUCCH resources. After the user adjusts the MCS, the user transmits data on a grant-free resource corresponding to the TO and sends MCS information on the PUCCH. Furthermore, N bits are configured via the RRC for an MCS correspondence, such as 2 bits. 01 represents Quadrature Phase Shift Keying (QPSK). When the terminal adjusts the MCS to be the QPSK, the PUCCH carries 2 bits, 01, which means the QPSK. That is, a resource other than grant-free resources is used for notification.

Manner two: a PUSCH is used. The base station and the terminal agree in advance which RB index to send the MCS and agree to use a fixed modulation order and code rate for sending the MCS. For example, a low-index RB and the QPSK+a code rate of ½ are used. For example, if frequency domain resources allocated to the PUSCH are RB1 to RB10, RB1 is used for sending the MCS information. Then the base station knows that some resources collide with the SFI. The base station will firstly decode RB1 to obtain the MCS, and then decode and demodulate data information on the PUSCH.

(3) The rate matching is performed on all of the TOs for repeated transmissions in the uplink grant-free transmission that conflict with the dynamic SFI. The principle of the rate matching is to maintain a code rate in the MCS parameter configured via the RRC unchanged. Both the UE and the base station calculate a new modulation order according to the remaining available resources in the TO for the repetition, the user performs an uplink data transmission according to the code rate and the new modulation order, and the base station performs data demodulation according to the code rate and the new modulation order. That is, the terminal does not report the new modulation order.

Sixth Embodiment

This embodiment provides a repeated transmission method. In this embodiment, a new piece of DCI is introduced to indicate how to use a resource. A function of the new DCI is to reset some parameters configured for the UL grant-free transmission. Upon receiving the DCI, a UE merely changes a transmission parameter of an indicated TO, and continues transmission of unindicated TOs in an original manner (semi-static configuration). The new DCI needs to be scrambled with a new RNTI to distinguish the DCI from other DCI used for granted data transmissions and other DCI used for activation or deactivation. The parameters configured for the UL grant-free transmission and reconfigured through the new DCI include at least one of the following parameters:

a time domain resource, a frequency domain resource, a number K of repeated transmissions configured via RRC, a TO index, an MCS, or a time when a reconfigured parameter takes effect or a number of times that the reconfigured parameter takes effect.

Specifically, according to the new DCI, an indication of the TO may be performed in any one of manner below.

(1) The number K of repeated transmissions configured via the RRC is not allowed to be reset through the newly-introduced DCI. According to a current frame structure, a base station indicates to the UE an index of a TO in which the UL grant-free transmission collides with the frame structure, time-frequency domain resources and the MCS of the TO in which the UL grant-free transmission collides with the frame structure, and the UE transmits the corresponding TO according to indication information in the DCI. Time that the parameter reconfigured through the DCI takes effect may be indicated through 1 bit, where 0 means that the parameter reset through the DCI merely takes effect once (for this time of reconfiguration), and 1 means that the parameter reset through the DCI takes effect multiple times until the base station reconfigures UL grant-free resources for the UE or the SFI changes again.

Optionally, considering overheads of an indication of frequency domain resources, the DCI may not include a frequency domain resource indication field, that is, the frequency domain resources are not reset, and a size of the frequency domain resources is still configured according to that before reconfiguration through the DCI.

(2) The number K of repeated transmissions configured via the RRC is allowed to be reconfigured through the newly-introduced DCI. The DCI needs to indicate a new number K of repeated transmissions and the indexes of TO corresponding to the number of transmissions and indicate time-frequency domain resources and MCSs for the corresponding TO indexes, and the UE transmits the corresponding TOs according to the indication information in the DCI. Time that the parameter reconfigured through the DCI takes effect may be indicated through 1 bit, where 0 means that the parameter reset through the DCI merely takes effect once (for this time of reconfiguration), and 1 means that the parameter reset through the DCI takes effect multiple times until the base station reconfigures the UL grant-free resources for the UE or the SFI changes again.

Optionally, considering the overheads of the indication of frequency domain resources, the DCI may not include the frequency domain resource indication field, that is, the frequency domain resources are not reconfigured, and the size of the frequency domain resources is still configured according to that before the reconfiguration through the DCI.

Seventh Embodiment

This embodiment provides a repeated transmission method. In a UL grant-free transmission, to improve reliability, a gNB will configure a plurality of repeated transmissions for a traffic packet. When a UE performs a repeated transmissions, if a certain repetition collides with a dynamic SFI, and not all of symbols in a TO for the repetition collide with the dynamic SFI, the UE does not discard the repeated transmission, merely deletes a corresponding symbol that collides, and transmits data on a symbol that does not collide.

Furthermore, a base station retransmits UL data deleted due to the collision by using an available resource on a symbol or a slot behind a time domain position where a last TO in a grant-free transmission period is located.

Eighth Embodiment

This embodiment provides a repeated transmission method. As long as a transmission direction of one symbol at a time domain position where a certain TO is located collides with a semi-static SFI, the TO is not counted into a number of repetitions, and a base station will delay configuring the TO.

However, traffic with a strict latency requirement such as URLLC requires that a duration from an arrival of a TB to an end of all times of repeated sending cannot exceed latency of 1 ms. For a delay in sending a TO, a terminal may complete multiple times of repeated sending without the latency being exceeded in a manner below.

The base station configures a time window T via RRC signaling, and the terminal determines a practical transmission of the TO and a number of times according to the time window T.

Figure 9:
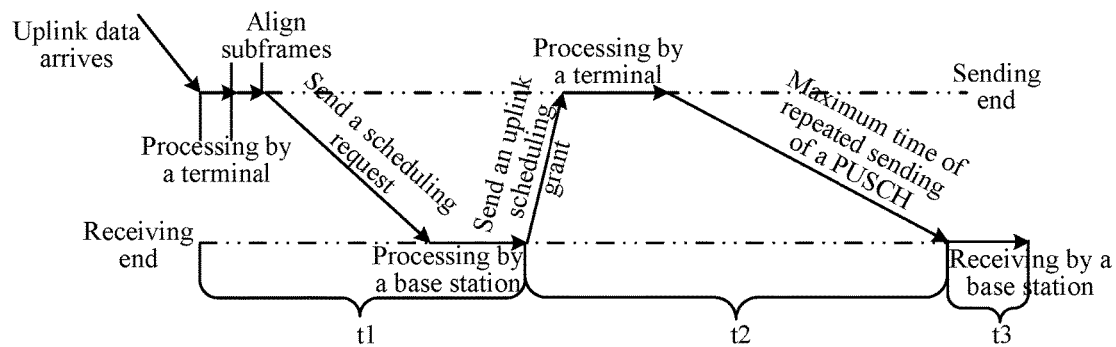
FIG. 9 is a schematic diagram illustrating latency according to an embodiment of the present disclosure.

Optionally, as shown in FIG. 9, a size of T refers to a time interval t2 from when a last symbol of a CORESET where DCI for dynamic scheduling is located is detected by the terminal to a time domain duration of data sending corresponding to a maximum actual number of repetitions that can be supported. A sum of t2 and processing time t1+t3 of the terminal and the base station does not exceed, for example, a latency requirement of 1 ms.

Furthermore, if the terminal determines that the duration to TO #n is less than or equal to t2, the terminal may send uplink data on TO #n. If the terminal determines that the duration to TO #n is greater than t2, the terminal may not send the uplink data on TO #n.

Optionally, for TO #n, n may be any one or more of [1, K]. K is the number of repetitions configured by a higher layer and notified through the DCI.

FIG. 9 schematically shows that the latency of 1 ms is divided into multiple time periods. In FIG. 9, t1+t2+t3 is equal to the latency of 1 ms, t1 is total time for the terminal to process the uplink data, alignment subframes, and sending an SR, and for the base station to process the SR, t2 is total time of a time domain duration within which the terminal detects the last symbol of the CORESET where the DCI is located, demodulates the DCI, prepares a PUSCH, and repeatedly sends the PUSCH, and t3 is total time for the base station to demodulate PUSCH data and determine an acknowledgement (ACK) or negative acknowledgement (NACK).

Figure 10:
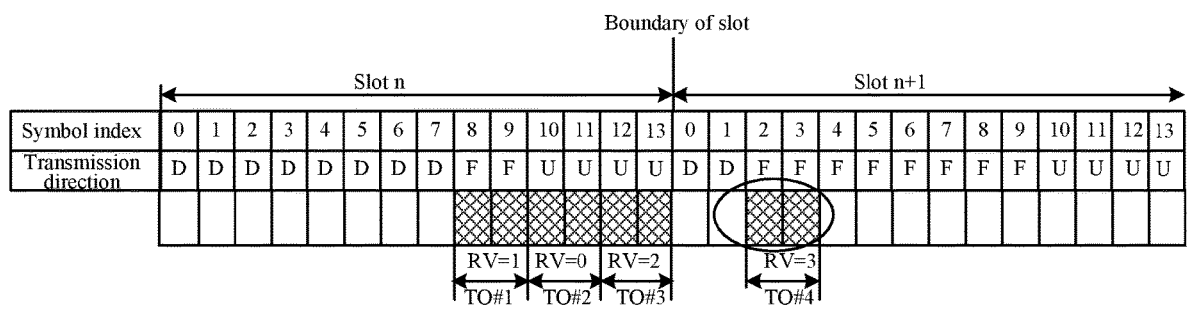
FIG. 10 is a schematic diagram illustrating an uplink data transmission according to an embodiment of the present disclosure.

For the aggregation transmission of the PUSCH scheduled through the DCI, the RRC or the DCI notifies that the number K of times of repeated sending is 4. As shown in FIG. 10, time domain positions of four TOs are not allocated in a same slot. Since transmission directions of symbols #0 and #1 on slot n+1 are D, TO #4 is configured on symbols #2 and #3.

In conjunction with a schematic diagram illustrating latency shown in FIG. 9, the terminal determines that the sending of the PUSCH on TO #4 in FIG. 10 will exceed t2 according to a size of t2. Therefore, the terminal will not send a fourth repetition of the PUSCH on TO #4.

Alternatively, the terminal determines that the sending of the PUSCH on TO #4 in FIG. 10 will not exceed a threshold of t2, and thus the terminal will send the fourth repetition of the PUSCH on TO #4.

Assuming that the terminal finally determines that the PUSCH can merely be repeatedly sent three times, the "time domain duration of data sending corresponding to the maximum actual number of repetitions that can be supported" mentioned above refers to a time domain duration of the practical three times of repeated data sending from a first time of sending on TO #1 to TO #3 where the repeated sending ends.

Ninth Embodiment

Figure 11:
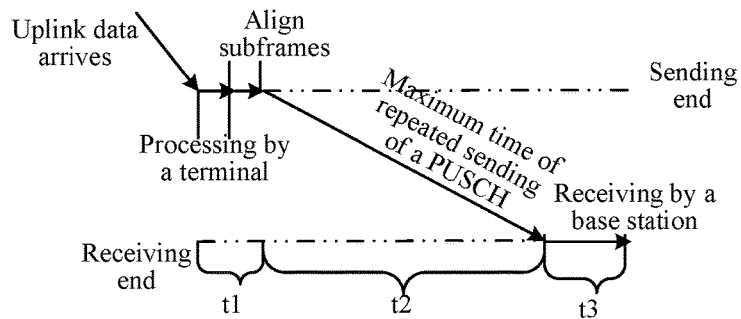
FIG. 11 is a schematic diagram illustrating latency according to an embodiment of the present disclosure.

For uplink grant-free repeated transmissions of a PUSCH, as shown in FIG. 11, a size of T refers to a time interval t2 from when a terminal performs a first transmission of the PUSCH to a time domain duration of data sending corresponding to a maximum actual number of repetitions that can be supported. A sum of t2 and processing time t1+t3 of the terminal and a base station does not exceed, for example, a latency requirement of 1 ms.

FIG. 11 schematically shows that the latency of 1 ms is divided into multiple time periods. In FIG. 11, t1+t2+t3 is equal to the latency of 1 ms, t1 is time for the terminal to process uplink data and align subframes, t2 is a time domain duration within which the terminal repeatedly sends the PUSCH, and t3 is total time for the base station to demodulate PUSCH data and determine an ACK/NACK.

Figure 12:
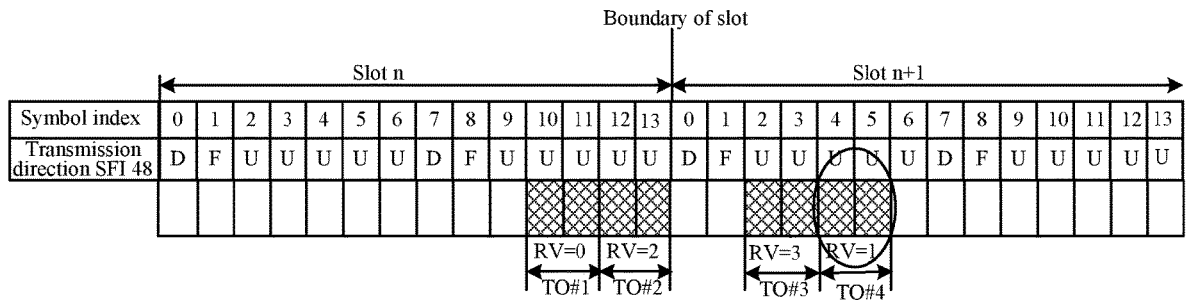
FIG. 12 is a schematic diagram illustrating an uplink data transmission according to an embodiment of the present disclosure.

For the grant-free repeated transmissions of the PUSCH, RRC or DCI notifies that the number K of times of repeated sending is 4. As shown in FIG. 12, time domain positions of four TOs are not allocated in a same slot. Since a dynamic SFI indicates that transmission directions of symbols #0 and #1 on slot n+1 are D and F, TO #3 is configured on symbols #2 and #3, and TO #4 is configured on symbols #4 and #5.

In conjunction with a schematic diagram illustrating latency shown in FIG. 11, the terminal determines that the sending of the PUSCH on TO #3 and TO #4 in FIG. 12 will exceed t2 according to a size of t2. Therefore, the terminal will not send a fourth repetition of the PUSCH on TO #3 and TO #4.

Alternatively, the terminal determines that the sending of the PUSCH on TO #3 and TO #4 in FIG. 12 will not exceed a threshold of t2, and thus the terminal will send the fourth repetition of the PUSCH on TO #3 and TO #4.

Assuming that the terminal finally determines that the PUSCH can merely be repeatedly sent two times, the "time domain duration of data sending corresponding to the maximum actual number of repetitions that can be supported" mentioned above refers to a time domain duration of the practical two times of repeated data sending from a first time of sending on TO #1 to TO #2 where the repeated sending ends.

Tenth Embodiment

This embodiment provides a repeated transmission method. For a delay in sending a TO, a terminal may complete multiple times of repeated sending without latency being exceeded in a manner below.

A base station notifies the terminal of an actual number of repetitions.

The base station does not notify the terminal of a size of a time window t2. The base station itself determines that TO #n cannot be used for sending PUSCH data according to t1+t2+t3 not exceeding a target value of latency, for example, 1 ms, otherwise a threshold of t2 will be exceeded. Therefore, the base station notifies the terminal of the actual number of repetitions through DCI.

Optionally, the base station notifies the terminal of the actual number of repetitions through the DCI.

Optionally, for TO #n, n may be any one or more of [1, K]. K is the number of repetitions configured by a higher layer.

Eleventh Embodiment

This embodiment provides a repeated transmission method. In multiple embodiments above, for later time domain symbols that can send a TO, transmission directions of these symbols can merely be F or U. Moreover, these symbols will not collide with a PDCCH blind detection period and a semi-static downlink traffic transmission. When a semi-static frame structure indicates that a transmission direction of a first symbol where a delayed TO is located is F, and the symbol is located immediately after a D symbol, whether a PUSCH can be transmitted on the F symbol needs to be made clearly. Possible manners are described below.

(1) The F symbol cannot be used for transmitting uplink data.

Figure 13:
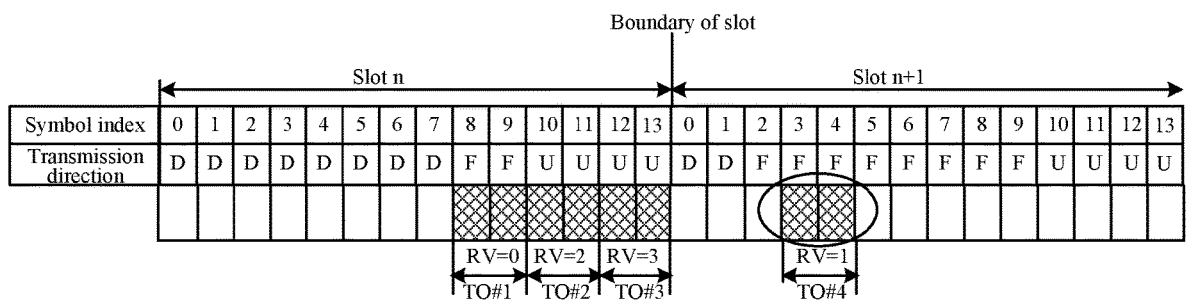
FIG. 13 is a schematic diagram illustrating an uplink data transmission according to an embodiment of the present disclosure.

When signaling of the semi-static frame structure indicates that a direction of a symbol is F and the symbol is located immediately after the D symbol, the symbol cannot be used for transmitting the uplink data. As shown in FIG. 13, TO #4 can merely send the PUSCH from a time domain position corresponding to symbol #3 having a direction F.

(2) When the adjacent D symbol is used for sending DCI/PDSCH/PDCCH, the F symbol cannot be used for transmitting the uplink data. When the D symbol is not used for sending the DCI, but used for sending, for example, a reference signal (RS), a PSS/SSS, or downlink data, where the RS may include a DMRS, a CSI-RS, a PTRS, etc., the F symbol can be used for transmitting the uplink data.

Twelfth Embodiment

Figure 14:
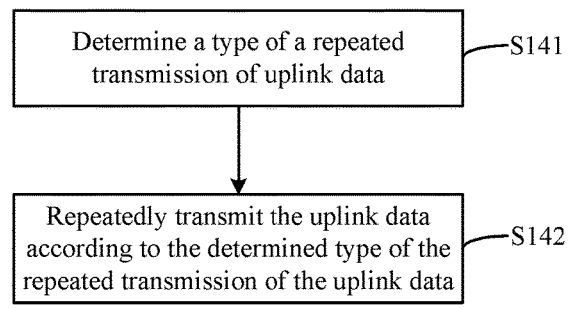
FIG. 14 is a flowchart of a repeated transmission method according to a twelfth embodiment of the present disclosure.

This embodiment provides a repeated transmission method. Referring to FIG. 14, the repeated transmission method includes S141 and S142.

In S141, whether a type of a repeated transmission of uplink data is a first transmission type or a second transmission type is determined. The first transmission type is repeatly transmitted uplink data according to a plurality of slots, and the second transmission type is repeatly transmitted uplink data according to a plurality of mini-slots in one slot.

In S142, the uplink data is repeatedly transmitted according to the determined type of the repeated transmission of the uplink data.

In some embodiments, a step of indicating a type of repeatly transmitted uplink data to be the first transmission type or the second transmission type may include a step described below.

An indication is performed through higher-layer RRC signaling or physical layer DCI signaling. In some embodiments, the step of indicating the type of repeatly transmitted uplink data to be the first transmission type or the second transmission type may include a step described below. The first transmission type and the second transmission type are distinguished according to a DMRS sequence+an Orthogonal Cover Code (OCC) or a DMRS sequence+a CS index.

In some embodiments, the step of indicating the type of repeatly transmitted uplink data to be the first transmission type or the second transmission type may include a step described below.

The first transmission type and the second transmission type are distinguished according to different radio network temporary identifiers (RNTIs).

Currently, Release 15 (R15), a first phase of 5G, has introduced slot-based aggregation based on dynamic scheduling and grant-free slot-based repetitions. Specifically, it means that a terminal repeatedly sends a TB by use of a plurality of slots, and the TB is allocated with same time domain resources on each slot. To support the enhancement of aggregation transmissions based on dynamic scheduling and uplink grant-free repeated transmissions in aspects of latency and reliability, Release 16 (R16), a second phase of 5G, needs to introduce mini-slot based aggregation or repetitions. For example, the terminal repeatedly sends the TB on multiple mini-slots consecutive in time domain within one slot, and each mini-slot has a same time domain duration. In this application, a transmission solution of repeated sending of the TB based on multiple slots is referred to as the first transmission type, and a transmission solution of aggregation and repeated sending of the TB based on multiple mini-slots in one slot is referred to as the second transmission type.

According to a time domain notification manner in 5G R15, it is assumed that a number of repetitions configured by a base station is K. The base station merely notifies a time domain starting position and a time domain duration of a first TO. However, the terminal does not know whether time domain positions of the remaining (K−1) TOs are configured on consecutive (K−1) slots according to the first transmission type or configured on consecutive (K−1) mini-slots according to the second transmission type. Therefore, regardless of DCI dynamic scheduling or grant-free transmissions, the following solutions are provided to solve this problem:

Solution one: the indication is performed through the higher-layer RRC signaling or the physical layer DCI signaling. 1 bit is introduced to indicate the first transmission type or the second transmission type to the terminal. For example, 0 represents the first transmission type, and 1 represents the second transmission type.

Solution two: they are distinguished according to the DMRS sequence+the OCC or the DMRS sequence+the CS index. For example, for a certain terminal, a cyclic shift (CS) 1 of the DMRS sequence allocated by the base station to the terminal represents the first transmission type; a CS6 (just different) of the DMRS sequence allocated by the base station to the terminal represents the second transmission type.

Solution three: they are distinguished according to different radio-network temporary identifiers (RNTIs). For example, for dynamically scheduled repeated transmissions of a PUSCH, C-RNTI1 represents the first transmission type, and C-RNTI2 represents the second transmission type. For grant-free repeated transmissions of the PUSCH, CS-RNTI1 represents the first transmission type, and CS-RNTI2 represents the second transmission type.

Thirteenth Embodiment

Figure 15:
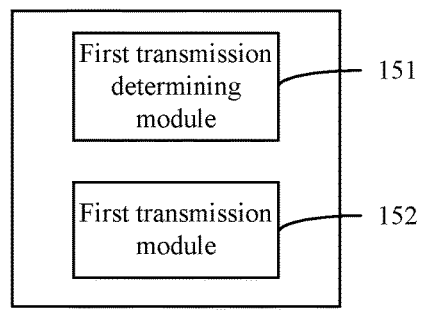
FIG. 15 is a structural diagram of a repeated transmission apparatus according to a thirteenth embodiment of the present disclosure.

This embodiment provides a repeated transmission apparatus. Referring to FIG. 15, the repeated transmission apparatus includes a first transmission determining module 151 and a first transmission module 152.

The first transmission determining module 151 is configured to determine a plurality of TOs for uplink data to be repeatedly transmitted.

The first transmission module 152 is configured to: when at least one TO, among the plurality of TOs for the uplink data to be repeatedly transmitted, does not conflict with a transmission direction of a slot configuration, repeatedly transmit the uplink data on the TO.

In some embodiments, the step in which the uplink data is repeatedly transmitted on the TO may include a step described below.

The uplink data is repeatedly transmitted from an earliest TO in the time domain that does not conflict with the transmission direction of the slot configuration. The transmission direction of the slot configuration may include an uplink symbol U, a downlink symbol D, and a flexibly configured symbol F. For the uplink data to be repeatedly transmitted in multiple embodiments of the present disclosure, a transmission direction matched with the uplink data is U, that is, when the transmission direction of the slot configuration is U, the TO of the uplink data does not conflict with the transmission direction of the slot configuration; if the transmission direction of the slot configuration is D, the TO certainly conflicts with it; and if the transmission direction of the slot configuration is F, the conflict or not is determined according to a current transmission situation.

In some embodiments, the step in which the uplink data to be repeatedly transmitted is transmitted from the earliest TO in the time domain that does not conflict with the transmission direction of the slot configuration may include a step described below.

Among the uplink data to be repeatedly transmitted, uplink data with a redundancy version (RV) index of 0 is repeatedly transmitted from the earliest TO in the time domain. Generally, an RV index corresponding to an earliest TO which may transmit uplink data is 0, which follows an agreement between a base station and a terminal, and complies with a rule thereof. When the same piece of uplink data to be repeatedly transmitted includes two or more pieces of uplink data with an RV index of 0, a first RV index of 0 or any RV index of 0 may be taken as reference.

Alternatively, among the uplink data to be repeatedly transmitted, uplink data corresponding to the earliest TO in the time domain is repeatedly transmitted from the earliest TO in the time domain. In addition to the reference to RV=0, the uplink data corresponding to the earliest TO in the time domain which does not conflict may start to be transmitted from the earliest TO in the time domain. In this case, an RV index of the uplink data starting to be transmitted may not be 0.

In some embodiments, the earliest TO in the time domain that does not conflict with the transmission direction of the slot configuration includes following TOs:

among the plurality of TOs, an earliest TO in the time domain in which none of time domain symbols conflicts with the transmission direction of the slot configuration; this means that for the earliest TO in the time domain, none of the time domain symbols in the TO conflicts with the transmission direction of the slot configuration; if the TO includes two time domain symbols, neither of the two time domain symbols conflicts with the transmission direction of the slot configuration, for example, the corresponding transmission direction of the slot configuration is UU or FU;

or among the plurality of TOs, an earliest TO in the time domain in which at least one time domain symbol does not conflict with the transmission direction of the slot configuration. In this case, the earliest TO in the time domain means that as long as one of time domain symbols in the TO does not conflict, the TO may be considered as the earliest TO in the time domain which does not conflict.

In some embodiments, the slot configuration may be obtained in at least one of manners below.

A slot configuration is indicated by DCI.

A slot configuration is indicated via RRC.

In some embodiments, the step in which the uplink data is repeatedly transmitted on the TO may include that when at least one time domain symbol in the TO does not conflict with the transmission direction of the slot configuration, rate matching is performed on a non-conflicting time domain symbol in the TO. Since at least one time domain symbol in the TO does not conflict with the transmission direction of the slot configuration and the other symbols may conflict, to ensure a normal transmission of the uplink data, the rate matching is performed on the non-conflicting time domain symbol in the TO.

In some embodiments, the step in which the rate matching is performed on the non-conflicting time domain symbol in the TO may include a step described below.

A modulation order in an MCS parameter configured via the RRC is maintained unchanged, a new code rate is calculated according to remaining available resources in the TO, and the rate matching is performed according to the new code rate.

Alternatively, a new modulation order and a code rate are calculated for an uplink transmission, information about the calculated modulation order is reported to the base station, and the code rate is calculated according to the modulation order and the remaining available resources in the TO.

Alternatively, a new modulation order is calculated according to available resources, and the uplink data is directly sent according to a code rate and the new modulation order.

In some embodiments, the step in which the uplink data is repeatedly transmitted on the TO may further include a step described below.

The DCI is detected to indicate a usage situation of the TO. The DCI is a newly added detection means for a repeated transmission of the uplink data on a base station side, and the terminal may determine a usage situation of a current TO by detecting the DCI. In some embodiment, the step in which the DCI is detected to indicate the usage situation of the TO includes steps described below.

The DCI is detected to acquire a relevant parameter configured for an uplink grant-free transmission.

A transmission parameter of an indicated TO is adjusted, and the uplink data is repeatedly transmitted according to an adjusted TO.

In some embodiments, the relevant parameter configured for the uplink grant-free transmission may include at least one of: a time domain resource, a frequency domain resource, a number K of repeated transmissions configured via the RRC, a TO index, an MCS, or a time when a reconfigured parameter takes effect or a number of times that the reconfigured parameter takes effect.

In some embodiments, the step in which the uplink data is repeatedly transmitted on the TO may further include: not counting a TO in which a time domain symbol conflicts with the transmission direction of the slot configuration into a number of repeated transmissions of the uplink data, and continuing the repeated transmissions of the uplink data on a TO configured later. This means that the uplink data is not transmitted on a conflicting TO, and a non-conflicting TO is directly configured on later time domain symbols for a transmission.

In some embodiments, the step in which the uplink data is repeatedly transmitted on the TO further includes: repeatedly transmitting uplink data corresponding to the TO in which the time domain symbol conflicts with the transmission direction of the slot configuration on a preconfigured redundant TO. This means that when the base station configures TOs for the terminal, a number of repetitions required by the terminal is directly added by a certain redundant configuration amount, to flexibly adjust a repeated transmission of an uplink signal. For example, when the number of repeated transmissions required by the terminal is 4, the number of TOs configured by the base station for the terminal may be 5, so that when one of the first four TOs conflicts, the redundant TO may make up 4 available TOs to repeatedly send the uplink data.

In some embodiments, the step in which the uplink data is repeatedly transmitted on the TO further includes: repeatedly transmitting the uplink data on a preconfigured TO which does not conflict with the transmission direction of the slot configuration. This means that the TOs are directly configured in a pre-configuration manner, time domain symbols which will conflict with the transmission direction of the slot configuration are skipped, and the TOs are directly configured on non-conflicting time domain symbols.

In some embodiments, further included is acquiring a time window, and determining a situation of sending the uplink data on a delayed TO through the time window. The time window is set to ensure latency. Among 5G traffic, URLLC has a high latency requirement. If uplink data corresponding to the conflicting TOs is all delayed, a latency requirement may not be satisfied, resulting in problems of URLLC traffic. Therefore, the time window is set to monitor whether the number of repeated transmissions of the uplink data exceeds an expectation.

In some embodiments, a sum of the time window and processing time of the terminal and the base station is less than or equal to a first preset threshold. The first preset threshold varies according to latency requirements of different traffic. For example, for the URLLC traffic, a size of the first preset threshold may be 1 ms. Of course, this embodiment merely provides a possible example of the first preset threshold. Those skilled in the art should understand that the first preset threshold may be a reasonable duration for a corresponding traffic type and is not limited in this embodiment.

In some embodiments, the step of determining the situation of sending the uplink data on the delayed TO through the time window includes a step described below.

Among the uplink data to be repeatedly transmitted, a duration from a first transmission to the delayed TO is compared with the time window, and when the duration is less than or equal to the time window, the uplink data may be sent on the delayed TO.

Alternatively, among the uplink data to be repeatedly transmitted, a duration from when a last symbol of a control resource set CORESET where the DCI is located is detected to the delayed TO is compared with the time window, and when the duration is less than or equal to the time window, the uplink data may be sent on the delayed TO.

In some embodiments, the step in which the uplink data is repeatedly transmitted on the TO may further include a step described below.

A actual number of repetitions of the uplink data is determined according to an indication from the base station. In this case, the indication from the base station is directly received to determine the number of repeated transmissions. For example, the base station determines the number of repeated transmissions to be 2 according to the latency of the uplink data, and then a terminal side repeatedly transmits the uplink data twice on non-conflicting TOs. Even if the number is set to 4, two repeated transmissions indicated by the base station are still performed. In some embodiments, the step in which the actual number of repetitions of the uplink data is determined according to the indication from the base station may include a step described below.

It is determined whether the uplink data is capable of being sent on each TO according to a target value of latency, and the actual number of repetitions is determined.

In some embodiments, the transmission direction of the slot configuration includes a downlink symbol D, an uplink symbol U, and a flexibly configured symbol F; where when the transmission direction of the slot configuration indicates N consecutive F symbols, and a transmission direction of an adjacent symbol before the N consecutive F symbols is D, the uplink data is repeatedly transmitted from a time domain symbol corresponding to an M-th F among the N consecutive F symbols, where M≤N, and the first (M−1) F symbols among the N consecutive F symbols serve as a guard period. Since downlink data is sent in D symbols, and according to different types of downlink data, a processing duration which the downlink data tends to occupy may include not only time domain symbols for the downlink data but also a certain period of time behind, F is not suitable for sending the uplink data. To ensure downlink data processing, the M-th F among the N consecutive F symbols may serve as the TO for transmitting the uplink data, and the first (M−1) F symbols may serve as the guard period for the downlink data.

In some embodiments, when a duration required for processing downlink data transmitted on time domain symbols corresponding to Ds is greater than or equal to a second preset threshold, M<N.

This embodiment provides a repeated transmission apparatus. The plurality of transmission occasions (TOs) for the uplink data to be repeatedly transmitted is determined, and when at least one TO, among the plurality of TOs for the uplink data to be repeatedly transmitted, does not conflict with the transmission direction of the slot configuration, the uplink data is repeatedly transmitted on the TO, thereby implementing the repeated transmissions of the uplink data, preventing the uplink data to be repeatedly transmitted from being directly discarded in case of a conflict, saving network resources, and ensuring user experience.

Fourteenth Embodiment

Figure 16:
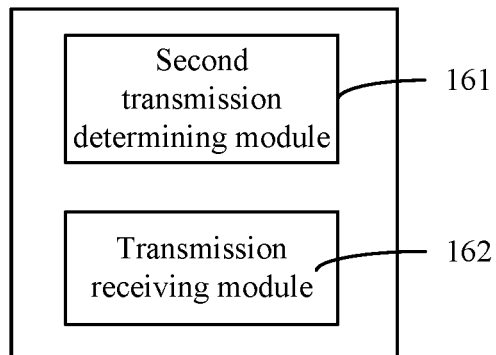
FIG. 16 is a structural diagram of a repeated transmission apparatus according to a fourteenth embodiment of the present disclosure.

This embodiment provides a repeated transmission apparatus. Referring to FIG. 16, the repeated transmission apparatus includes a second transmission determining module 161 and a transmission receiving module 162.

The second transmission determining module 161 is configured to determine a plurality of TOs for uplink data to be repeatedly transmitted.

The transmission receiving module 162 is configured to: when at least one TO, among the plurality of TOs for the uplink data to be repeatedly transmitted, does not conflict with a transmission direction of a slot configuration, receive repeatedly transmitted uplink data on the TO.

In some embodiments, the step in which the repeatedly transmitted uplink data is received on the TO includes that when at least one time domain symbol in the TO conflicts with the transmission direction of the slot configuration, rate matching is performed on a non-conflicting time domain symbol in the TO.

In some embodiments, the step in which the rate matching is performed on the non-conflicting time domain symbol in the TO includes: maintaining a modulation order in an MCS parameter configured via RRC unchanged, calculating a new code rate according to remaining available resources in the TO, and performing the rate matching according to the new code rate.

In some embodiments, the step in which the repeatedly transmitted uplink data is received on the TO includes a step described below.

DCI is configured to indicate a usage situation of the TO to a terminal.

In some embodiment, the step in which the DCI is configured to indicate the usage situation of the TO includes a step described below.

A relevant parameter configured for an uplink grant-free transmission is reconfigured through the DCI.

In some embodiments, the step in which the repeatedly transmitted uplink data is received on the TO includes a step described below.

The terminal is notified of an actual number of repeated transmissions of the uplink data.

In some embodiments, the step in which the terminal is notified of the actual number of repeated transmissions of the uplink data include a step described below.

It is determined whether the uplink data is capable of being sent on each TO according to a target value of latency, and an actual number of repetitions is determined.

Fifteenth Embodiment

Figure 17:
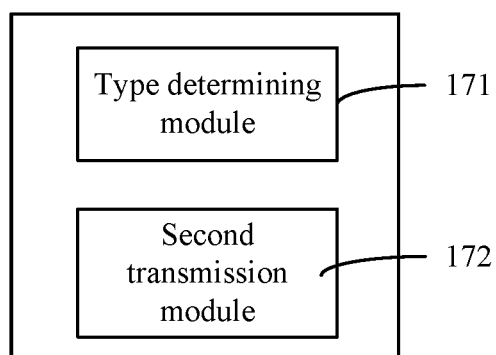
FIG. 17 is a structural diagram of a repeated transmission apparatus according to a fifteenth embodiment of the present disclosure.

This embodiment provides a repeated transmission apparatus. Referring to FIG. 17, the repeated transmission apparatus includes a type determining module 171 and a second transmission module 172.

The type determining module 171 is configured to determine whether a type of a repeated transmission of uplink data is a first transmission type or a second transmission type. The first transmission type is repeatly transmitted uplink data according to a plurality of slots, and the second transmission type is repeatly transmitted uplink data according to a plurality of mini-slots in one slot.

The second transmission module 172 is configured to repeatedly transmit the uplink data according to the determined type of the repeated transmission of the uplink data.

In some embodiments, a step of indicating a type of repeatly transmitted uplink data to be the first transmission type or the second transmission type may include a step described below.

An indication is performed through higher-layer RRC signaling or physical layer DCI signaling.

In some embodiments, the step of indicating the type of repeatly transmitted uplink data to be the first transmission type or the second transmission type may include a step described below.

The first transmission type and the second transmission type are distinguished according to a DMRS sequence+an OCC or a DMRS sequence+a CS index.

In some embodiments, the step of indicating the type of repeatly transmitted uplink data to be the first transmission type or the second transmission type may include a step described below.

The first transmission type and the second transmission type are distinguished according to different radio network temporary identifiers (RNTIs).

Currently, Release 15 (R15), a first phase of 5G, has introduced slot-based aggregation according to dynamic scheduling and grant-free slot-based repetitions. Specifically, it means that a terminal repeatedly sends a TB by use of a plurality of slots, and the TB is allocated with same time domain resources on each slot. To support the enhancement of aggregation transmissions according to dynamic scheduling and uplink grant-free repeated transmissions in aspects of latency and reliability, Release 16 (R16), a second phase of 5G, needs to introduce mini-slot based aggregation or repetitions. For example, the terminal repeatedly sends the TB on multiple mini-slots consecutive in time domain within one slot, and each mini-slot has a same time domain duration. In this application, a transmission solution of repeated sending of the TB according to multiple slots is referred to as the first transmission type, and a transmission solution of aggregation and repeated sending of the TB according to multiple mini-slots in one slot is referred to as the second transmission type.

According to a time domain notification manner in 5G R15, it is assumed that a number of repetitions configured by a base station is K. The base station merely notifies a time domain starting position and a time domain duration of a first TO. However, the terminal does not know whether time domain positions of the remaining (K−1) TOs are configured on consecutive (K−1) slots according to the first transmission type or configured on consecutive (K−1) mini-slots according to the second transmission type. Therefore, regardless of DCI dynamic scheduling or grant-free transmissions, the following solutions are provided to solve this problem:

Solution one: the indication is performed through the higher-layer RRC signaling or the physical layer DCI signaling. 1 bit is introduced to indicate the first transmission type or the second transmission type to the terminal. For example, 0 represents the first transmission type, and 1 represents the second transmission type.

Solution two: they are distinguished according to the DMRS sequence+the OCC or the DMRS sequence+the CS index. For example, for a certain terminal, a cyclic shift (CS) 1 of the DMRS sequence allocated by the base station to the terminal represents the first transmission type; a CS6 (just different) of the DMRS sequence allocated by the base station to the terminal represents the second transmission type.

Solution three: they are distinguished according to different radio-network temporary identifiers (RNTIs). For example, for dynamically scheduled repeated transmissions of a PUSCH, C-RNTI1 represents the first transmission type, and C-RNTI2 represents the second transmission type. For grant-free repeated transmissions of the PUSCH, CS-RNTI1 represents the first transmission type, and CS-RNTI2 represents the second transmission type.

Sixteenth Embodiment

Figure 18:
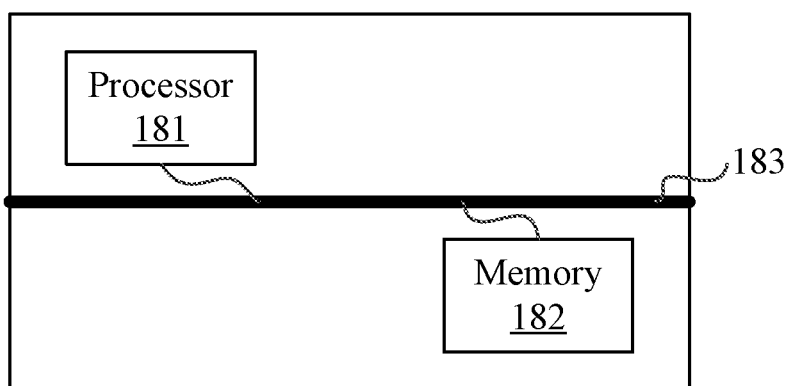
FIG. 18 is a structural diagram of a network device according to a sixteenth embodiment of the present disclosure.

This embodiment further provides a network device. Referring to FIG. 18, the network device includes a processor 181, a memory 182 and a communication bus 183.

The communication bus 183 is configured to implement connection and communication between the processor 181 and the memory 182.

The processor 181 is configured to execute one or more computer programs stored in the memory 182 to implement steps of the repeated transmission method in the above-mentioned multiple embodiments, which are not repeated here.

This embodiment further provides a computer readable storage medium. The computer readable storage medium includes volatile or nonvolatile, removable or non-removable media implemented in any method or technology for storage of information (such as computer readable instructions, data structures, computer program modules or other data). The computer readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a digital versatile disc (DVD) or another optical disc storage, a magnetic cassette, a magnetic tape, disk storage or another magnetic storage apparatus, or any other medium used for storing desired information and accessible by a computer.

The computer readable storage medium in this embodiment may be configured to store one or more computer programs executable by a processor to implement at least one step of the repeated transmission method in multiple embodiments described above.

This embodiment further provides a computer program (or computer software) which may be distributed on a computer readable medium and executed by a computing apparatus to implement at least one step of the repeated transmission method in multiple embodiments described above.

This embodiment further provides a computer program product including a computer readable apparatus on which the computer program shown above is stored. The computer readable apparatus in this embodiment may include the computer readable storage medium shown above. It can be seen that those of ordinary skill in the art should understand that functional modules/units in all or part of the steps of the method, the system and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to the division of physical components. For example, one physical component may have multiple functions, or one function or step may be performed jointly by several physical components. Some or all physical components may be implemented as software executed by processors such as central processing units, digital signal processors or microcontrollers, hardware, or integrated circuits such as application specific integrated circuits. In addition, as is known to those of ordinary skill in the art, a communication medium generally includes computer readable instructions, data structures, computer program modules or other data in modulated data signals such as carriers or other transmission mechanisms, and may include any information delivery medium. Therefore, the present disclosure is not limited to any specific combination of hardware and software.

What is claimed is:

1. A method of repeated transmission, comprising:
    determining a plurality of transmission occasions (TOs), for uplink data to be repeatedly transmitted; and
    in response to at least one TO, among the plurality of TOs for the uplink data to be repeatedly transmitted, being not conflicted with a transmission direction of a slot configuration, repeatedly transmitting the uplink data on the at least one TO,
    wherein if the transmission direction of the slot configuration indicates N consecutive flexible (F) symbols, and an adjacent symbol before the N consecutive F symbols is a downlink (D) symbol, the uplink data is repeatedly transmitted from a time domain symbol corresponding to an M-th F symbol among the N consecutive F symbols, wherein M≤N, and first (M−1) F symbols among the N consecutive F symbols serve as a guard period, wherein N is a first number and M is a second number.

2. The method of claim 1, wherein the repeatedly transmitting the uplink data on the at least one TO comprises:
    in response to the plurality of TOs being not conflicted with the transmission direction of the slot configuration, transmitting the uplink data to be repeatedly transmitted from an earliest TO in a time domain that does not conflict with the transmission direction of the slot configuration.

3. The method of claim 1, wherein each of the F symbols comprises a symbol that is flexibly configured in transmission direction.

4. A device for repeated transmission, comprising at least one processor configured to implement the method of claim 3.

5. The method of claim 1, wherein N is 1, 2 or 8.

6. A device for repeated transmission, comprising at least one processor configured to implement the method of claim 5.

7. The method of claim 1, wherein the slot configuration is obtained in at least one of following manners:
    detecting a slot format indicator field in downlink control information (DCI); or
    detecting a slot format indication command configured via radio resource control (RRC).

8. The method of claim 1, wherein the repeatedly transmitting the uplink data on the at least one TO comprises: if at least one time domain symbol in each of the at least one TO does not conflict with the transmission direction of the slot configuration, performing rate matching on a non-conflicting time domain symbol in the each of the at least one TO.

9. The method of claim 1, wherein repeatedly transmitting the uplink data on the at least one TO comprises: detecting DCI to indicate a usage situation of the at least one TO.

10. The method of claim 1, wherein the repeatedly transmitting the uplink data on the at least one TO further comprises at least one of:
    not counting a TO in which a time domain symbol conflicts with the transmission direction of the slot configuration into a number of repeated transmissions of the uplink data, and continuing the repeated transmissions of the uplink data on a TO configured later;
    repeatedly transmitting uplink data corresponding to a TO in which a time domain symbol conflicts with the transmission direction of the slot configuration on a preconfigured redundant TO; or
    repeatedly transmitting the uplink data on a preconfigured TO which does not conflict with the transmission direction of the slot configuration.

11. The method of claim 1, wherein the slot configuration comprises at least the D symbol, at least one uplink (U) symbol, and at least the N consecutive F symbols.

12. A device for repeated transmission, comprising at least one processor configured to implement the method of claim 11.

13. A method for receiving repeated transmission, comprising:
    determining a plurality of transmission occasions (TOs) for uplink data to be repeatedly transmitted; and
    in response to at least one TO, among the plurality of TOs for the uplink data to be repeatedly transmitted, being not conflicted with a transmission direction of a slot configuration, receiving repeatedly transmitted uplink data on the at least one TO,
    wherein if the transmission direction of the slot configuration indicates N consecutive flexible (F) symbols, and an adjacent symbol before the N consecutive F symbols is a downlink (D) symbol, the uplink data is repeatedly transmitted from a time domain symbol corresponding to an M-th F symbol among the N consecutive F symbols, wherein M<N, and first (M−1) F symbols among the N consecutive F symbols serve as a guard period, wherein N is a first number and M is a second number.

14. The method of claim 13, wherein each of the F symbols comprises a symbol that is flexibly configured in transmission direction.

15. The method of claim 13, wherein N is 1, 2 or 8.

16. The method of claim 13, wherein the slot configuration comprises at least the D symbol, at least one uplink (U) symbol, and at least the N consecutive F symbols.

17. A device for repeated transmission, comprising at least one processor configured to implement the method of claim 1.

18. A device for receiving repeated transmission, comprising at least one processor configured to implement the method of claim 13.

19. A non-transitory computer readable storage medium storing instructions, which when executed by one or more processors can cause the one or more processors to:
    determine a plurality of transmission occasions (TOs), for uplink data to be repeatedly transmitted; and
    in response to at least one TO, among the plurality of TOs for the uplink data to be repeatedly transmitted, being not conflicted with a transmission direction of a slot configuration, repeatedly transmit the uplink data on the at least one TO,
    wherein if the transmission direction of the slot configuration indicates N consecutive flexible (F) symbols, and an adjacent symbol before the N consecutive F symbols is a downlink (D) symbol, the uplink data is repeatedly transmitted from a time domain symbol corresponding to an M-th F symbol among the N consecutive F symbols, wherein $M \leq N$, and first (M−1) F symbols among the N consecutive F symbols serve as a guard period, wherein N is a first number and M is a second number.

20. A non-transitory computer readable storage medium storing instructions, which when executed by one or more processors can cause the one or more processors to:
   determine a plurality of transmission occasions (TOs) for uplink data to be repeatedly transmitted; and
   in response to at least one TO, among the plurality of TOs for the uplink data to be repeatedly transmitted, being not conflicted with a transmission direction of a slot configuration, receiving repeatedly transmit uplink data on the at least one TO,
   wherein if the transmission direction of the slot configuration indicates N consecutive flexible (F) symbols, and an adjacent symbol before the N consecutive F symbols is a downlink (D) symbol, the uplink data is repeatedly transmitted from a time domain symbol corresponding to an M-th F symbol among the N consecutive F symbols, wherein $M < N$, and first (M−1) F symbols among the N consecutive F symbols serve as a guard period, wherein N is a first number and M is a second number.

\* \* \* \* \*

UNITED STATES PATENT AND TRADEMARK OFFICE
CERTIFICATE OF CORRECTION

| | | |
|---|---|---|
| PATENT NO. | : 11,451,336 B2 | Page 1 of 1 |
| APPLICATION NO. | : 17/114734 | |
| DATED | : September 20, 2022 | |
| INVENTOR(S) | : Ren et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 20 days.

Signed and Sealed this
Eleventh Day of February, 2025

Coke Morgan Stewart
*Acting Director of the United States Patent and Trademark Office*